United States Patent
Kwak et al.

(10) Patent No.: US 8,854,783 B2
(45) Date of Patent: Oct. 7, 2014

(54) BATTERY PACK

(75) Inventors: Eunok Kwak, Yongin-si (KR); Youngcheol Jang, Yongin-si (KR); Seok Koh, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 256 days.

(21) Appl. No.: 13/052,960

(22) Filed: Mar. 21, 2011

(65) Prior Publication Data

US 2012/0106015 A1 May 3, 2012

(30) Foreign Application Priority Data

Nov. 1, 2010 (KR) ......................... 10-2010-0107792

(51) Int. Cl.
| | |
|---|---|
| H01M 10/0525 | (2010.01) |
| H01M 10/50 | (2006.01) |
| H01M 2/02 | (2006.01) |
| H01M 2/34 | (2006.01) |
| H01M 10/42 | (2006.01) |

(52) U.S. Cl.
CPC .......... *H01M 2/0207* (2013.01); *H01M 10/502* (2013.01); *H01M 2/348* (2013.01); *H01M 10/0525* (2013.01); *Y02E 60/12* (2013.01); *H01M 10/4257* (2013.01)
USPC ............ 361/103; 361/106; 361/704; 361/713

(58) Field of Classification Search
USPC ................................. 361/103, 106, 704, 713
See application file for complete search history.

(56) References Cited

U.S. PATENT DOCUMENTS

| | | | | |
|---|---|---|---|---|
| 3,345,568 A | * | 10/1967 | Errichiello et al. | .......... 455/90.3 |
| 5,473,511 A | * | 12/1995 | Reddy et al. | ................. 361/719 |
| 6,177,209 B1 | * | 1/2001 | Okutoh | ........................... 429/62 |
| 6,178,628 B1 | * | 1/2001 | Clemens et al. | ................ 29/840 |
| 6,225,778 B1 | * | 5/2001 | Hayama et al. | ............. 320/112 |
| 6,531,246 B2 | * | 3/2003 | Hanafusa et al. | ............ 429/162 |
| 6,861,821 B2 | * | 3/2005 | Masumoto et al. | ........... 320/107 |
| 7,262,956 B2 | * | 8/2007 | Suzuki et al. | ............ 361/679.01 |
| 2008/0008910 A1 | | 1/2008 | Koh | |
| 2010/0098974 A1 | | 4/2010 | Kim et al. | |

FOREIGN PATENT DOCUMENTS

| | | |
|---|---|---|
| EP | 1 723 197 | 9/2005 |
| JP | 2002-124305 A | 4/2002 |

(Continued)

OTHER PUBLICATIONS

3M Thermally conductive Tape—9889FR, Short Data Sheet, 3M Corp., Sep. 2008, p. 1.*
3M Thermally Conducxtive Acrylic Soft Tape 9889FR, Technical Data, 3M Corp., Sep. 2008, pp. 1-2.*

(Continued)

*Primary Examiner* — Zeev V Kitov
(74) *Attorney, Agent, or Firm* — Christie, Parker & Hale, LLP

(57) ABSTRACT

A battery pack that can quickly transfer heat from a battery cell to a positive temperature coefficient (PTC) to quickly cut off a current when the battery cell is heated to a high temperature. A battery pack includes: a battery cell including a cell tab; a protective circuit module including an internal terminal connected to the cell tab, a PTC connected to the internal terminal, and an interconnection pattern between the internal terminal and the PTC and electrically connecting the internal terminal to the PTC; and a heat transfer member including a surface contacting the interconnection pattern, and opposite sides respectively connected to the internal terminal and the PTC.

10 Claims, 3 Drawing Sheets

(56) References Cited

FOREIGN PATENT DOCUMENTS

| | | | |
|---|---|---|---|
| KR | 10-0392340 B | 2/2001 | |
| KR | 10-0693057 B | 5/2003 | |
| KR | 10-0502354 B | 12/2004 | |
| KR | 10-2006-0126838 A | 12/2006 | |
| KR | 10-0760784 B1 | 9/2007 | |
| KR | 10-2010-0044487 A | 4/2010 | |
| WO | WO 2009/103462 * | 2/2009 | .............. H01M 2/10 |

OTHER PUBLICATIONS

D. Steinberg, Cooling Techniques for Electronic Equipment, 2nd Ed., 1991, John Wiley & Sons, Inc., pp. 36-37.*

Office Action dated Feb. 29, 2012 issued by the KIPO to the Korean Patent Application No. 10-2010-0107792, 6 pages.

KIPO Notice of Allowance dated Sep. 28, 2012 for KR 10-2010-0107792 (5 pages).

Machine English Translation of JP 2002-124305 A (8 pages).

* cited by examiner

BATTERY PACK

CROSS-REFERENCE TO RELATED APPLICATION

This application claims priority to and the benefit of Korean Patent Application No. 10-2010-0107792, filed in the Korean Intellectual Property Office on Nov. 1, 2010, the entire content of which is incorporated herein by reference.

BACKGROUND

1. Field

Aspects of embodiments of the present invention relate to a battery pack.

2. Description of the Related Art

Battery packs include a rechargeable battery cell and a protective circuit module that controls charging and discharging of the battery cell. The protective circuit module includes a plurality of devices for controlling the charging and discharging. A lithium ion battery or lithium polymer battery is typically used as the battery cell.

Such a battery pack includes a positive temperature coefficient (PTC) that cuts off a current when heat is excessively generated from a battery cell during the charging and discharging thereof, so as to prevent or substantially prevent an excessive temperature increase, thereby ensuring the safety of the battery pack.

SUMMARY

According to an aspect of embodiments of the present invention, a battery pack can quickly transfer heat from a battery cell to a PTC to quickly cut off a current when the battery cell is heated to a high temperature.

According to an embodiment of the present invention, a battery pack includes: a battery cell including a cell tab; a protective circuit module including an internal terminal connected to the cell tab, a positive temperature coefficient (PTC) connected to the internal terminal, and an interconnection pattern between the internal terminal and the positive temperature coefficient and electrically connecting the internal terminal to the positive temperature coefficient; and a heat transfer member including a surface contacting the interconnection pattern, and opposite sides respectively connected to the internal terminal and the positive temperature coefficient.

The battery cell may be a pouch type battery cell.

The heat transfer member may include a thermally conductive acrylic tape. The thermally conductive acrylic tape may include ceramic particles, a pressure-sensitive acrylic material, and a flame-retardant material. The heat transfer member may include solder cream. The heat transfer member may include a stacked structure of thermally conductive acrylic tape and solder cream.

The heat transfer member may have a width that is greater than or equal to about 50% of a smaller value of a width of the internal terminal or a width of the positive temperature coefficient.

The positive temperature coefficient may be a chip positive temperature coefficient mounted on a surface of the protective circuit module.

The battery pack may further include a case defining a storage space receiving the battery cell therein. In one embodiment, the case includes at least one coupling protrusion, and the protective circuit module further includes at least one recess receiving the at least one coupling protrusion for coupling the protective circuit module to the case.

According to another embodiment of the present invention, a protective circuit module mountable to a battery cell for interrupting a current in the battery cell includes: a circuit board; an internal terminal on the circuit board and connectable to the battery cell; a positive temperature coefficient on the circuit board and connected to the internal terminal; an interconnection pattern between the internal terminal and the positive temperature coefficient and electrically connecting the internal terminal to the positive temperature coefficient; and a heat transfer member contacting the interconnection pattern and connected between the internal terminal and the positive temperature coefficient.

The heat transfer member may include a thermally conductive acrylic tape. The thermally conductive acrylic tape may include ceramic particles, a pressure-sensitive acrylic material, and a flame-retardant material. The heat transfer member may include solder cream. In one embodiment, the heat transfer member includes a stacked structure of thermally conductive acrylic tape and solder cream. The heat transfer member may have a width that is greater than or equal to about 50% of a smaller value of a width of the internal terminal or a width of the positive temperature coefficient.

BRIEF DESCRIPTION OF THE DRAWINGS

The above and other features and advantages will become more apparent to those of ordinary skill in the art by describing in detail some exemplary embodiments of the present invention with reference to the attached drawings, which are incorporated in and constitute a part of this specification. The drawings illustrate some exemplary embodiments of the present disclosure and, together with the description, serve to explain principles of the present invention.

DETAILED DESCRIPTION

Some exemplary embodiments of the present invention will be described more fully hereinafter with reference to the accompanying drawings; however, embodiments of the present invention may be embodied in different forms and should not be construed as limited to the exemplary embodiments illustrated and set forth herein. Rather, these exemplary embodiments are provided by way of example for understanding of the invention and to convey the scope of the invention to those skilled in the art. As those skilled in the art would realize, the described embodiments may be modified in various ways, all without departing from the spirit or scope of the present invention.

Figure 1A:
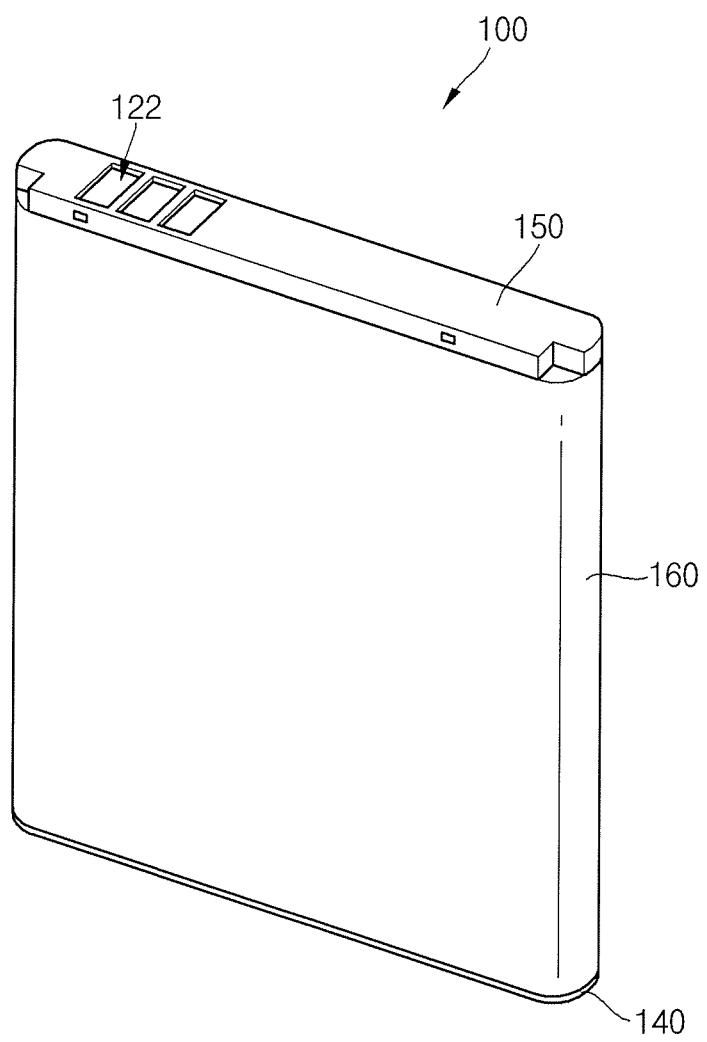
FIG. 1A is a perspective view of a battery pack according to an embodiment of the present invention.
Figure 1B:
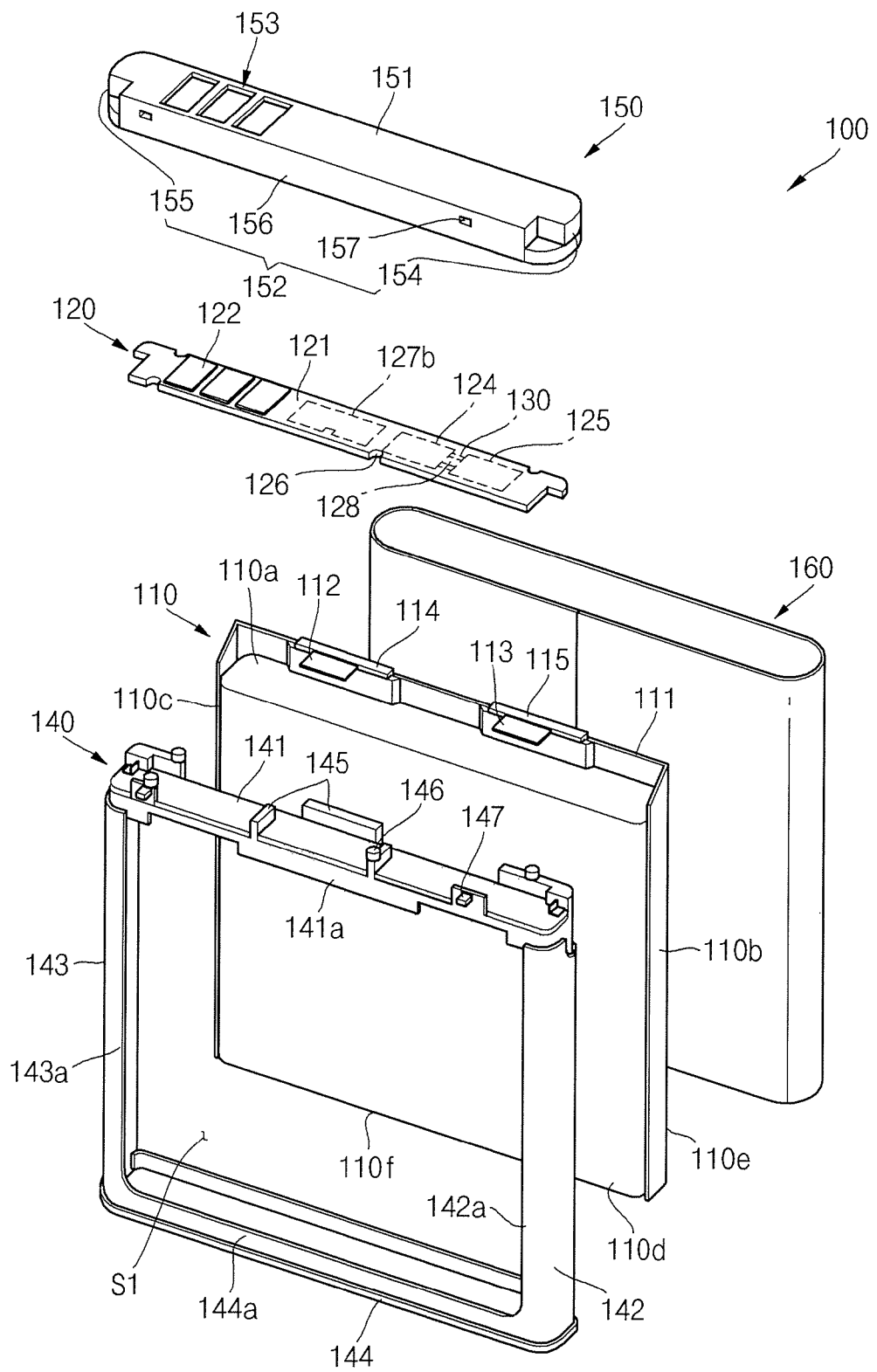
FIG. 1B is an exploded perspective view of the battery pack of FIG. 1A.
Figure 2:
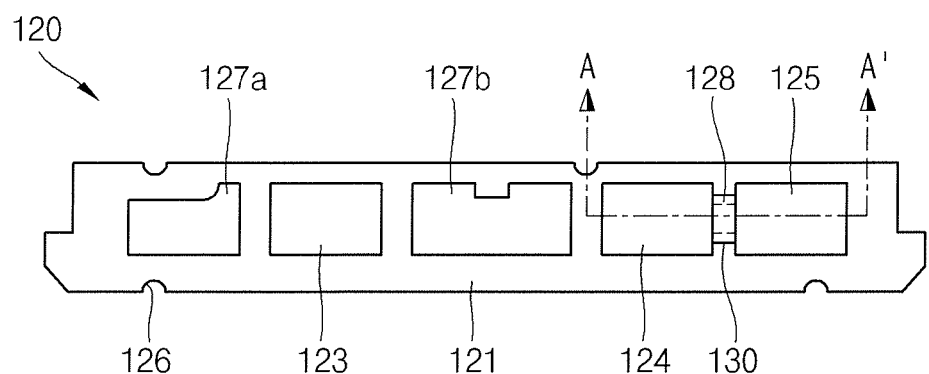
FIG. 2 is a bottom view of a protective circuit module of a battery pack according to an embodiment of the present invention.
Figure 3:
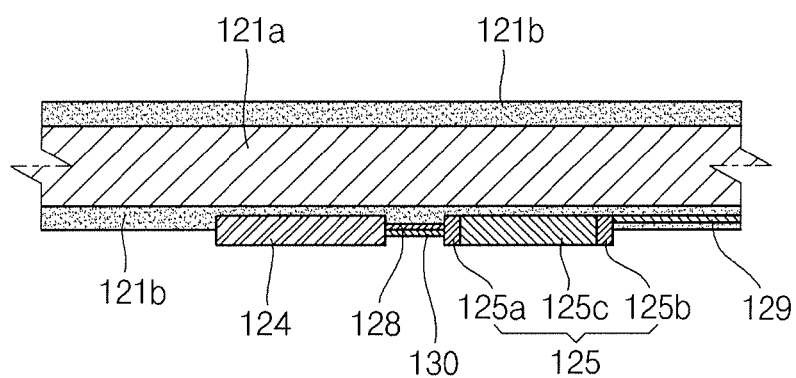
FIG. 3 is a partial cross-sectional view of the protective circuit module of FIG. 2, taken along line A-A'.

FIG. 1A is a perspective view of a battery pack according to an embodiment of the present invention. FIG. 1B is an exploded perspective view of the battery pack of FIG. 1A. FIG. 2 is a bottom view of a protective circuit module of a battery pack according to an embodiment of the present invention. FIG. 3 is a partial cross-sectional view of the protective circuit module of FIG. 2, taken along line A-A'.

Referring to FIGS. 1A through 3, a battery pack 100 according to an embodiment of the present invention includes a battery cell 110, a protective circuit module 120, a heat transfer member 130, a frame case 140, a cover 150, and a label 160.

The battery cell 110 may be one of a prismatic type battery cell, a cylinder type battery cell, and a pouch type battery cell. In one embodiment, as shown and described herein, the battery cell 110 is a pouch type battery cell; however the present disclosure is not limited thereto.

The battery cell 110, according to one embodiment, includes: an electrode assembly (not shown) including a negative electrode, a positive electrode, and a separator disposed therebetween; a pouch case 111 receiving the electrode assembly; and cell tabs 112 and 113 connected respectively to the positive and negative electrodes of the electrode assembly and protruding out of the pouch case 111. The electrode assembly may include liquid electrolyte or gel electrolyte. In one embodiment, the cell tabs 112 and 113 contacting the pouch case 111 may be provided with insulating tapes 114 and 115 for preventing or substantially preventing a short circuit. However, in another embodiment, the insulating tapes 114 and 115 may be omitted. The cell tabs 112 and 113 may extend out of the pouch case 111 and be bent to be connected to the protective circuit module 120.

The battery cell 110, in one embodiment, includes an upper portion 110a provided with the protective circuit module 120, a pair of first side (e.g., short side) portions 110b and 110c connected to the upper portion 110a, a pair of second side (e.g., long side) portions 110d and 110e connected to the upper portion 110a, and a lower portion 110f opposite the upper portion 110a and connected to the first and second side portions 110b, 110c, 110d, and 110e. In one embodiment, the first side portions 110b and 110c connected to the upper portion 110a of the battery cell 110 have a smaller width than that of the second side portions 110d and 110e connected to the upper portion 110a.

The protective circuit module 120 is disposed on the upper portion 110a of the battery cell 110, and is electrically connected to the battery cell 110 to control charging and discharging of the battery cell 110.

Referring to FIGS. 1B, 2, and 3, according to one embodiment, the protective circuit module 120 includes a circuit board 121, external terminals 122, internal terminals 123 and 124, a positive temperature coefficient (PTC) 125, coupling recesses 126, and an interconnection pattern 128.

The circuit board 121 may include a plate-shaped insulating layer 121a, interconnections (not shown) formed on a surface of the insulating layer 121a, and a passivation layer 121b covering the interconnections.

The lower surface of the circuit board 121 may be provided with a circuit 127a for sensing a charge voltage and a discharge voltage of the battery cell 110, and a switch 127b for shutting off a current in a state of an overcharge voltage, an overdischarge voltage, or an overcurrent.

The external terminals 122, in one embodiment, are installed on the upper surface of the circuit board 121 for connecting the protective circuit module 120 to an external device (not shown).

The internal terminals 123 and 124 are installed on the lower surface of the circuit board 121 and face the battery cell 110. The internal terminals 123 and 124, in one embodiment, are electrically connected to the cell tabs 112 and 113 of the battery cell 110 through direct welding. In one embodiment, the internal terminal 123 and the cell tab 112 are electrically connected to a positive interconnection (not shown) of the protective circuit module 120, and the internal terminal 124 and the cell tab 113 are electrically connected to a negative interconnection (not shown) of the protective circuit module 120 through the PTC 125. For clarity of description, the internal terminals 123 and 124 are referred to hereinafter as a first internal terminal and a second internal terminal, respectively.

The PTC 125, in one embodiment, is disposed at the lower side of the circuit board 121 and is electrically connected to the second internal terminal 124.

The PTC 125 cuts off a current when a temperature of the battery cell 110 is greater than or equal to an allowed or predetermined temperature to prevent or substantially prevent a malfunction or safety problem due to heat from the battery cell 110. In another embodiment, the PTC 125 may be connected to the first internal terminal 123 instead of the second internal terminal 124.

In one embodiment, the PTC 125 may be a chip PTC that is surface-mounted on the circuit board 121.

The PTC 125 may include terminals 125a and 125b and a functional device 125c. The terminal 125a disposed at a side of the PTC 125 may contact the interconnection pattern 128 to be described later, and the terminal 125b disposed at another side of the PTC 125 may contact a pattern 129.

The coupling recesses 126, in one embodiment, are formed at peripheral portions (e.g., long side edges) of the circuit board 121 for physically coupling the protective circuit module 120 to the frame case 140.

The interconnection pattern 128, in one embodiment, is disposed at the lower side of the circuit board 121 between the second internal terminal 124 and the PTC 125, and ends of the interconnection pattern 128 are connected to the second internal terminal 124 and the PTC 125. Thus, a current generated from the battery cell 110 flows through the second internal terminal 124, the interconnection pattern 128, the PTC 125, and the pattern 129. Heat generated from the battery cell 110 is transferred to the PTC 125 through the cell tab 113, the second internal terminal 124, and the interconnection pattern 128.

The heat transfer member 130, in one embodiment, has a plate shape, and is disposed between the second internal terminal 124 and the PTC 125. Further, in one embodiment, a surface of the heat transfer member 130 contacts a surface of the interconnection pattern 128, and ends of the heat transfer member 130 contact the second internal terminal 124 and the PTC 125, respectively. Thus, heat generated from the battery cell 110 is transferred to the PTC 125 through the heat transfer member 130, in addition to the second internal terminal 124 and the interconnection pattern 128.

The heat transfer member 130 may include any member that is electrically insulative and thermally conductive. For example, in various embodiments, the heat transfer member 130 may be a thermally conductive acrylic tape that is formed of ceramic particles, a pressure-sensitive acrylic material, and a flame-retardant material, or may be formed of solder cream. In another embodiment, the heat transfer member 130 may be a stacked structure of a thermally conductive acrylic tape and solder cream.

The heat transfer member 130, in one embodiment, has a width that is greater than or equal to about 50% of the smaller value of the width of the second internal terminal 124 of the protective circuit module 120 or the width of the PTC 125. This is because, since the heat transfer member 130 functions as a passage for transferring heat, if the width of the heat transfer member 130 is too small, the heat transfer efficiency may be decreased.

The interconnection pattern 128 and the heat transfer member 130 are disposed between the second internal terminal 124 and the PTC 125 to quickly transfer heat, thereby preventing or substantially preventing a difference between heat generated from the battery cell 110 and heat sensed at the PTC 125 from being increased. Thus, when the battery cell 110 is heated to a high temperature, the PTC 125 quickly cuts off a current, thereby improving the stability of the battery pack 100.

In one embodiment, a surface of the heat transfer member 130 facing the battery cell 110 may be provided with an insulating part (not shown) for preventing or substantially preventing the emission of heat transferred to the heat transfer member 130.

The frame case 140, in one embodiment, surrounds the battery cell 110, and is physically coupled to the protective circuit module 120. The frame case 140, in one embodiment, covers the upper portion 110a, the lower portion 110f, and the first side portions 110b and 110c of the battery cell 110 and exposes the second side portions 110d and 110e except for side edges of the second side portions 110d and 110e. Accordingly, the frame case 140 defines a storage space S1 for receiving the battery cell 110.

In one embodiment, the frame case 140 includes: plane parts 141, 142, 143, and 144 that cover the upper portion 110a, the lower portion 110f, and the first side portions 110b and 110c of the battery cell 110; and extension parts 141a, 142a, 143a, and 144a that are bent from ends of the respective plane parts 141, 142, 143, and 144 parallel to the side edges of the second side portions 110d and 110e and extend to the second side portions 110d and 110e so as to cover the side edges thereof.

The frame case 140, in one embodiment, further includes one or more support parts 145, one or more coupling protrusions 146, and at least one rib 147 on the plane part 141.

The support parts 145, in one embodiment, have tetragonal plate shapes and protrude from edges of the plane part 141 and a middle region to the protective circuit module 120. The support parts 145 support the protective circuit module 120 when the protective circuit module 120 is disposed on the upper side of the plane part 141, and provide a space for the cell tabs 112 and 113, the internal terminals 123 and 124, and the PTC 125 between the plane part 141 and the protective circuit module 120.

The coupling protrusions 146, in one embodiment, have a cylindrical shape and protrude to the protective circuit module 120 from the support part 145 corresponding to the coupling recesses 126 of the protective circuit module 120. The coupling protrusions 146 are fitted into the coupling recesses 126 to physically couple the protective circuit module 120 to the frame case 140.

The ribs 147, in one embodiment, have a tetragonal plate shape and protrude from a side portion of the support part 145. The ribs 147 are fitted into rib coupling holes 157 of the cover 150 described below to physically couple the frame case 140 to the cover 150.

In one embodiment, the frame case 140 configured as described above may be integrally formed through an injection molding process, and be formed of one of polycarbonate (PC), polyethylene terephthalate glycol (PETG), polyethylene (PE), polypropylene (PP), and acrylonitrile butadiene styrene (ABS).

The cover 150, in one embodiment, is coupled to the upper portion of the battery cell 110 and has an inner space that receives the protective circuit module 120. The cover 150, in one embodiment, includes a cover plate 151, and a side wall 152 extending from the cover plate 151 to the protective circuit module 120.

The cover plate 151 may have a shape similar to the circuit board 121. In one embodiment, an inner surface of the cover plate 151 contacts the upper surface of the circuit board 121.

The cover plate 151 has through holes 153 in regions corresponding to the external terminals 122. The through holes 153 expose the external terminals 122 to electrically connect the battery pack 100 to an external device (not shown).

The side wall 152 includes both longitudinal ends 154 and 155 of the cover 150, and connecting portions 156 connecting the longitudinal ends 154 and 155 to each other. In one embodiment, the longitudinal ends 154 and 155 and the connecting portions 156 are partially covered with the label 160, as described below.

The side wall 152, in one embodiment, includes the rib coupling holes 157 in regions of one or both of the connecting portions 156 corresponding to the ribs 147 of the frame case 140. The ribs 147 of the frame case 140 are fitted into the rib coupling holes 157 to physically couple the frame case 140 to the cover 150.

The label 160, in one embodiment, is attached to the battery cell 110 to surround the first side portions 110b and 110c and the second side portions 110d and 110e. In one embodiment, the label 160 partially covers the longitudinal ends 154 and 155 of the cover 150 and the connections 156. The label 160 improves coupling force between the battery cell 110, the frame case 140, and the cover 150.

According to embodiments of the present invention, since heat is quickly transferred from the battery cell to the PTC, a current can be quickly cut off when the battery cell is heated to a high temperature. Thus, the safety and reliability of the battery pack according to embodiments of the present invention are improved.

While some exemplary embodiments have been shown and described herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack comprising:
   a battery cell comprising a cell tab;
   a protective circuit module comprising a circuit board, a terminal on the circuit board and connected to the cell tab, a positive temperature coefficient member on the circuit board and connected to the terminal, and an interconnection pattern on the circuit board between the terminal and the positive temperature coefficient member and electrically connecting the terminal to the positive temperature coefficient member; and
   an electrically insulative heat transfer member contacting and covering a surface of the interconnection pattern, and comprising opposite ends respectively connected to the terminal and the positive temperature coefficient member,
   wherein the heat transfer member comprises a stacked structure of thermally conductive acrylic tape and solder cream.

2. The battery pack as claimed in claim 1, wherein the battery cell is a pouch type battery cell.

3. The battery pack as claimed in claim 1, wherein the thermally conductive acrylic tape comprises ceramic particles, a pressure-sensitive acrylic material, and a flame-retardant material.

4. The battery pack as claimed in claim 1, wherein the heat transfer member has a width that is greater than or equal to about 50% of a smaller value of a width of the terminal or a width of the positive temperature coefficient member.

5. The battery pack as claimed in claim 1, wherein the positive temperature coefficient member is a chip positive temperature coefficient member mounted on a surface of the protective circuit module.

6. The battery pack as claimed in claim 1, further comprising a case defining a storage space receiving the battery cell therein.

7. The battery pack as claimed in claim 6, wherein the case comprises at least one coupling protrusion, and the protective circuit module further comprises at least one recess receiving the at least one coupling protrusion for coupling the protective circuit module to the case.

8. A protective circuit module mountable to a battery cell for interrupting a current in the battery cell, the protective circuit module comprising:
- a circuit board;
- a terminal on the circuit board and connectable to the battery cell;
- a positive temperature coefficient member on the circuit board and connected to the terminal;
- an interconnection pattern on the circuit board between the terminal and the positive temperature coefficient member and electrically connecting the terminal to the positive temperature coefficient member; and
- an electrically insulative heat transfer member contacting and covering a surface of the interconnection pattern, and comprising opposite ends respectively connected to the terminal and the positive temperature coefficient member,
- wherein the heat transfer member comprises a stacked structure of thermally conductive acrylic tape and solder cream.

9. The protective circuit module as claimed in claim 8, wherein the thermally conductive acrylic tape comprises ceramic particles, a pressure-sensitive acrylic material, and a flame-retardant material.

10. The protective circuit module as claimed in claim 8, wherein the heat transfer member has a width that is greater than or equal to about 50% of a smaller value of a width of the terminal or a width of the positive temperature coefficient member.

* * * * *